(12) United States Patent
El-Batal et al.

(10) Patent No.: US 9,904,486 B2
(45) Date of Patent: Feb. 27, 2018

(54) SELECTIVELY POWERING A STORAGE DEVICE OVER A DATA NETWORK

(71) Applicant: Avago Technologies General IP (Singapore) Pte. Ltd, Singapore (SG)

(72) Inventors: Mohamad H. El-Batal, Boulder, CO (US); Jason M. Stuhlsatz, Norcross, GA (US); Greg Shogan, Round Rock, TX (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 205 days.

(21) Appl. No.: 14/333,757

(22) Filed: Jul. 17, 2014

(65) Prior Publication Data

US 2015/0026488 A1 Jan. 22, 2015

Related U.S. Application Data

(60) Provisional application No. 61/847,184, filed on Jul. 17, 2013.

(51) Int. Cl.
*G06F 3/06* (2006.01)
*G11B 33/12* (2006.01)

(52) U.S. Cl.
CPC .......... *G06F 3/0634* (2013.01); *G06F 3/067* (2013.01); *G06F 3/0625* (2013.01); *G06F 3/0689* (2013.01); *G11B 33/123* (2013.01); *Y02B 60/1246* (2013.01)

(58) Field of Classification Search
CPC ...... G06F 3/0625; G06F 3/0634; G06F 3/067; G06F 3/0689; Y02B 60/1246; G11B 33/123
See application file for complete search history.

(56) References Cited

U.S. PATENT DOCUMENTS

| 8,083,536 | B2 | 12/2011 | Leach | |
|---|---|---|---|---|
| 8,185,759 | B1 * | 5/2012 | Li | G06F 13/105 |
| | | | | 710/305 |
| 8,751,836 | B1 * | 6/2014 | Piszczek | G06F 1/3268 |
| | | | | 713/300 |

(Continued)

FOREIGN PATENT DOCUMENTS

WO 2012112308 A 8/2012

OTHER PUBLICATIONS

Power Over SAS for Signal Redriver, IPCOM000178136D—IP. com, Jan. 16, 2009.

*Primary Examiner* — Terrell Johnson
(74) *Attorney, Agent, or Firm* — Sheridan Ross P.C.

(57) ABSTRACT

Methods and structure for selectively powering a storage device over a data network. An exemplary system includes a power module configured to detect power from a host system via a network port. The system also includes an input/output controller configured to receive power derived from the network port of the power module, and in response, to identify a disk drive for a read/write operation based on information from the host system. With power derived from the network port, the power module is further configured to supply power to an expander that connects the disk drive to the input/output controller, and to supply power to the disk drive to perform the read/write operation.

20 Claims, 3 Drawing Sheets

(56) References Cited

U.S. PATENT DOCUMENTS

| | | | |
|---|---|---|---|
| 2002/0004912 A1* | 1/2002 | Fung | G06F 1/3203 |
| | | | 713/300 |
| 2008/0140898 A1* | 6/2008 | Bacom | G06F 1/266 |
| | | | 710/300 |
| 2009/0003361 A1* | 1/2009 | Bakthavathsalam | G06F 3/0607 |
| | | | 370/401 |
| 2009/0193150 A1* | 7/2009 | Graves | G06F 3/0607 |
| | | | 710/3 |
| 2009/0276647 A1* | 11/2009 | Boyd | G06F 1/3215 |
| | | | 713/320 |
| 2009/0292852 A1* | 11/2009 | Justice | G06F 1/187 |
| | | | 710/303 |
| 2011/0239009 A1* | 9/2011 | Noda | G06F 13/385 |
| | | | 713/300 |
| 2012/0243170 A1 | 9/2012 | Frink et al. | |
| 2013/0339552 A1* | 12/2013 | Wang | G06F 13/4068 |
| | | | 710/8 |

\* cited by examiner

SELECTIVELY POWERING A STORAGE DEVICE OVER A DATA NETWORK

CROSS REFERENCE TO RELATED APPLICATIONS

This document claims priority to, and thus the benefit of an earlier filing date from, U.S. Provisional Application No. 61/847,184 (filed on Jul. 17, 2013) entitled "APPLIANCES POWERED OVER ETHERNET AND SAS", which is hereby incorporated by reference. This patent application is also related to commonly owned and co-pending patent application 'TBD (hereinafter the "related patent application"), the contents of which are incorporated by reference.

FIELD OF THE INVENTION

The invention generally relates to powering devices over a data network.

BACKGROUND

The Power Over Ethernet (POE) standard, described in IEEE standards 802.3af and 802.3at, was originally designed and envisioned to power-up small Internet Protocol (IP) devices, such as wireless access points and IP cameras. POE enables a single cable (i.e., CAT5 Ethernet cable) to provide both data connection and electrical power. Using POE, a central power source may provide power to Ethernet devices for distances under 100 meters without individually powering the Ethernet devices with a dedicated AC outlet. However, end devices for storage systems (e.g., hard disk drives) and other communication protocols are not supported in the IEEE 802.3at and 802.3af standards.

SUMMARY

Systems and methods herein provide for powering storage devices in a storage system over a data network. In one embodiment, storage control system includes a power module configured to detect power from a host system via a network port. The storage control systems also includes an input/output controller configured to receive power derived from the network port of the power module, and in response, to identify a disk drive for a read/write operation based on information from the host system. With power derived from the network port, the power module is further configured to supply power to an expander that connects the disk drive to the input/output controller, and to supply power to the disk drive to perform the read/write operation. The power module is also configured to remove power to the disk drive after completion of the read/write operation, and to remove power to the input/output controller and to the expander after data of the read/write operation is sent to the host system.

Other exemplary embodiments (e.g., methods and computer readable media relating to the foregoing embodiments) are also described below.

BRIEF DESCRIPTION OF THE FIGURES

Some embodiments of the present invention are now described, by way of example only, and with reference to the accompanying figures. The same reference number represents the same element or the same type of element on all figures.

DETAILED DESCRIPTION

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
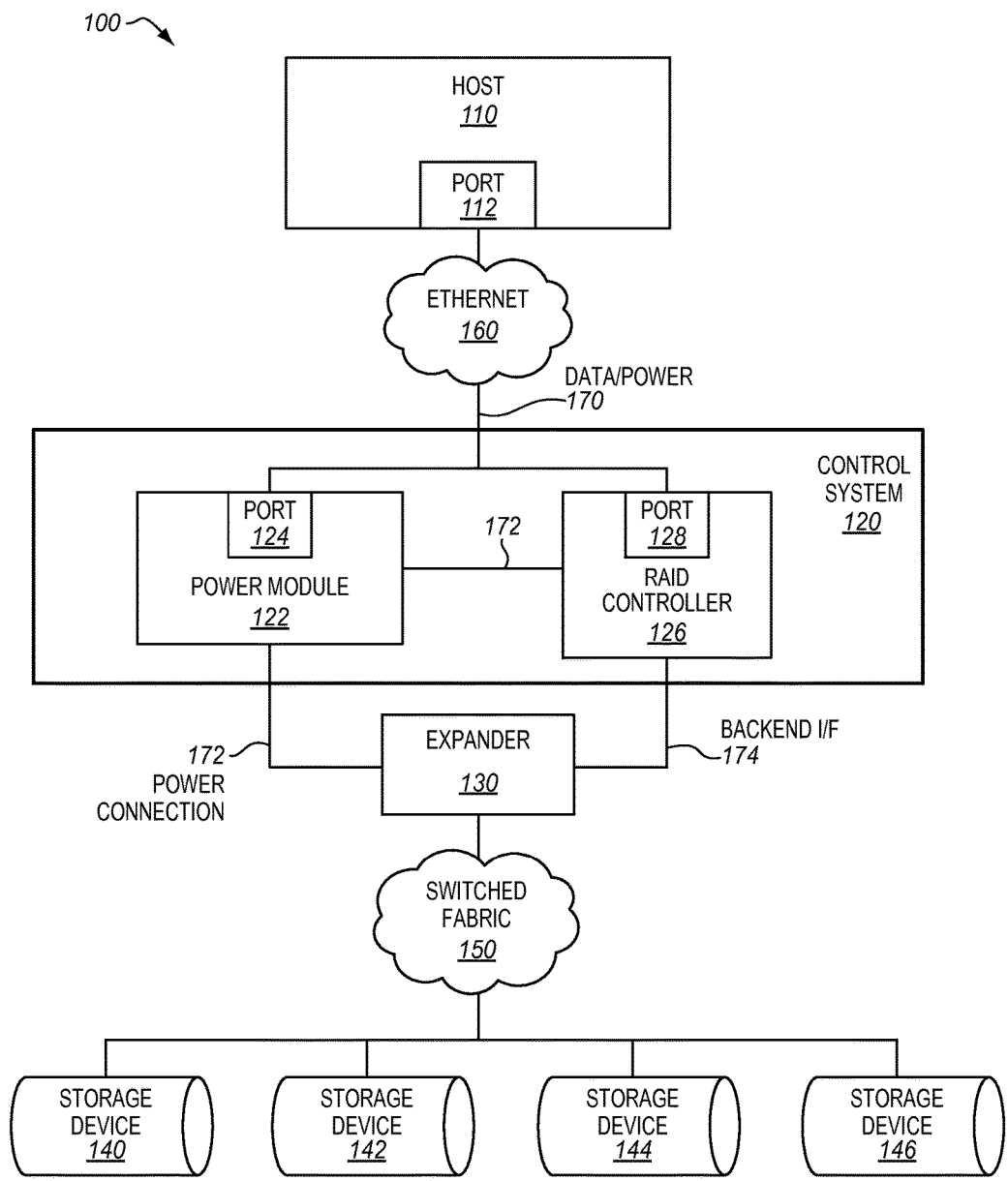
FIG. 1 is a block diagram of a storage system in an exemplary embodiment.

FIG. 1 is a block diagram of a storage system 100 in an exemplary embodiment. The storage system 100 includes a host 110, a control system 120, an expander 130, and storage devices 140-146. The control system 120 includes a RAID controller 126 that comprises any component/devices operable to manage a logical volume of data in accordance with RAID techniques (e.g., to manage a volume at RAID level 0, 1, 5, 6, etc.). The RAID controller 126 includes a port 128 for interfacing with the host 110 and exchanging I/O requests and/or reporting completions pertaining to a RAID volume. After translating a host I/O request into one or more individual I/O requests, the RAID controller 126 transmits the individual I/O requests via a backend interface 174 to route through the expander 130 and switched fabric 150 for interaction with storage devices (e.g., 140-146) that comprise the logical volume.

A typical data storage system often includes storage devices (e.g., hard disk drives) that are continually powered and optimized for fast latency in order to minimize data retrieval time. Each of these storage devices may collectively consume hundreds or thousands of watts at a given time, resulting in huge operating costs for data storage systems that manage many storage devices. Data storage systems also commonly continuously provide power to storage devices that contain large amounts of data but which are nonetheless rarely accessed for read/write operations.

In one embodiment, the storage devices 140-146 of the storage system 100 comprise cold storage devices. A cold storage device stores data that is infrequently accessed. Compared with so-called "hot" storage devices, cold storage devices are expected to be dormant for the majority of their service life. Since there is typically less concern with data access latency to a cold storage device, it may sometimes be advantageous for the storage system 100 to power-down the storage devices 140-146 until a read/write operation is to be performed thereto.

The storage system 100 of FIG. 1 is enhanced with a power module 122 configured to selectively power the RAID controller 126, the expander 130, and/or one or more of the storage devices 140-146 using power supplied from the host 110 over a data network (e.g., Ethernet 160). This may be advantageous, for example, when storage devices 140-146 of the storage system 100 comprise infrequently accessed cold storage devices because each of the RAID controller 126, the expander 130, and/or storage devices 140-146 may be powered off until the host 110 is to perform a read/write operation on one of storage devices 140-146.

Additionally, since the host 110 supplies operating power to the power module 122, the RAID controller 126, the expander 130, and/or storage devices 140-146, these components of the storage system 100 need not be powered with an external power source.

In one embodiment, the host 110 is configured to transmit power over the Ethernet 160 using the Power Over Ethernet (POE) techniques standardized by the IEEE 802.3 committee. POE is capable of delivering up to 25 watts of power in parallel with data (e.g., via a unified data/power connection 170), although the amount of power may vary depending on the particular implementation/standard in use. The ports 112, 124, and 128 of the host 110, power module 122, and RAID controller 126, respectively, may therefore comprise RJ45 connectors configured to power and/or communicate using the POE standard and Ethernet protocol over data/power connection 170. Under such a configuration (and described in further detail below), the host 110 is operable to perform read/write operations on storage devices 140-146 using, for example, up to 25 watts on an intermittent, or as-needed, basis. The energy savings for the storage system 100 are therefore significant in comparison with traditional storage implementations that power multiple devices at a time using hundreds of watts of power at a time and at all times.

In another embodiment, the host 110 is configured to transmit power over a Serial Attached Small Computer System Interface (SAS) network. The ports 112, 124, 128 may thus comprise SFF-8644 external HD mini-SAS ports (or other similar ports described in the SFF standard) configured to supply power in parallel with data over data/power connection 170 to achieve what is referred to herein as Power Over SAS (POS), and which is described in more detail in the related patent application. It will thus be appreciated that the storage system 100 is not limited to any particular data network and/or protocol, and that the host 110 and the control system 120 may interface with any suitable data network/protocol configured to deliver data and power in parallel over data/power connection 170.

In any case, the power module 122 of the control system 120 is configured to distribute power received from the host 110 over the data/power connection 170 to one or more of the RAID controller 126, the expander 130, and storage devices 140-146 via power connection(s) 172. The RAID controller 126 may receive power directly from the host 110 (e.g., via port 128), or may reserve port 128 for communication (e.g., I/O requests, status reports, etc.) and receive power indirectly via the power module 122 and a power connection 172. Although shown in FIG. 1 as separate ports, the ports 124 and 128 of the control system 120 may comprise a single port for the control system 120 which receives both the data and power via a single data/power connection 170 to operate the functionality of both the power module 122 and the RAID controller 126 as described herein.

When the RAID controller 126 receives an I/O request from the host 110, it may process the request into one or more commands (e.g., SAS and/or Serial Advanced Technology Attachment (SATA) commands) that are directed to individual storage devices 140-146 via the expander 130 and the backend interface 174. The backend interface 174, the expander 130, and the switched fabric 150 are operable to forward/route communications for the storage system 100 according to any combination of suitable storage network protocols, including for example, SAS, SATA, Small Computer System Interface (SCSI), FibreChannel, Ethernet, Internet SCSI (ISCSI), etc.

The expander 130 may include PHYs that can be coupled/paired with one another via switching circuitry in order to establish point-to-point connections to the storage devices 140-146 via the storage network protocol. Additionally, the expander 130 may manage the power allocation to the storage devices 140-146 either alone or in combination with the power module 122. For example, the expander 130 may exchange control and status information with one or more storage devices 140-146 to manage the amount of power allocated to those storage devices 140-146 via the power module 122. In other words, the expander 130 is configured to route power supplied over a data network (e.g., POE or POS) to individual storage devices 140-146.

The storage devices 140-146 implement the persistent storage capacity of storage system 100, and are capable of writing and/or reading data in a computer readable format. For example, the storage devices 140-146 may comprise magnetic hard disks, solid state drives, optical media, etc. compliant with protocols for SAS, Serial Advanced Technology Attachment (SATA), Fibre Channel, etc. Additionally, one or more of the storage devices 140-146 may implement storage space for one or more logical volumes by matter of design choice.

The host 110 comprises any suitable combination of hardware components capable of implementing programmed instructions for manipulating data. For example, the host 110 may comprise a server, a general purpose computer, an integrated circuit, etc. In one embodiment, the RAID controller 126 comprises a RAID-on-chip (ROC) processor. However, the RAID controller 126 may be implemented as hardware, software, or some combination thereof by matter of design choice. It will be appreciated that the particular arrangement, number, and configuration of components described herein is exemplary and non-limiting. For example, the storage system 100 may include additional hosts, RAID controllers, storage devices, storage volumes, etc.

Figure 2:
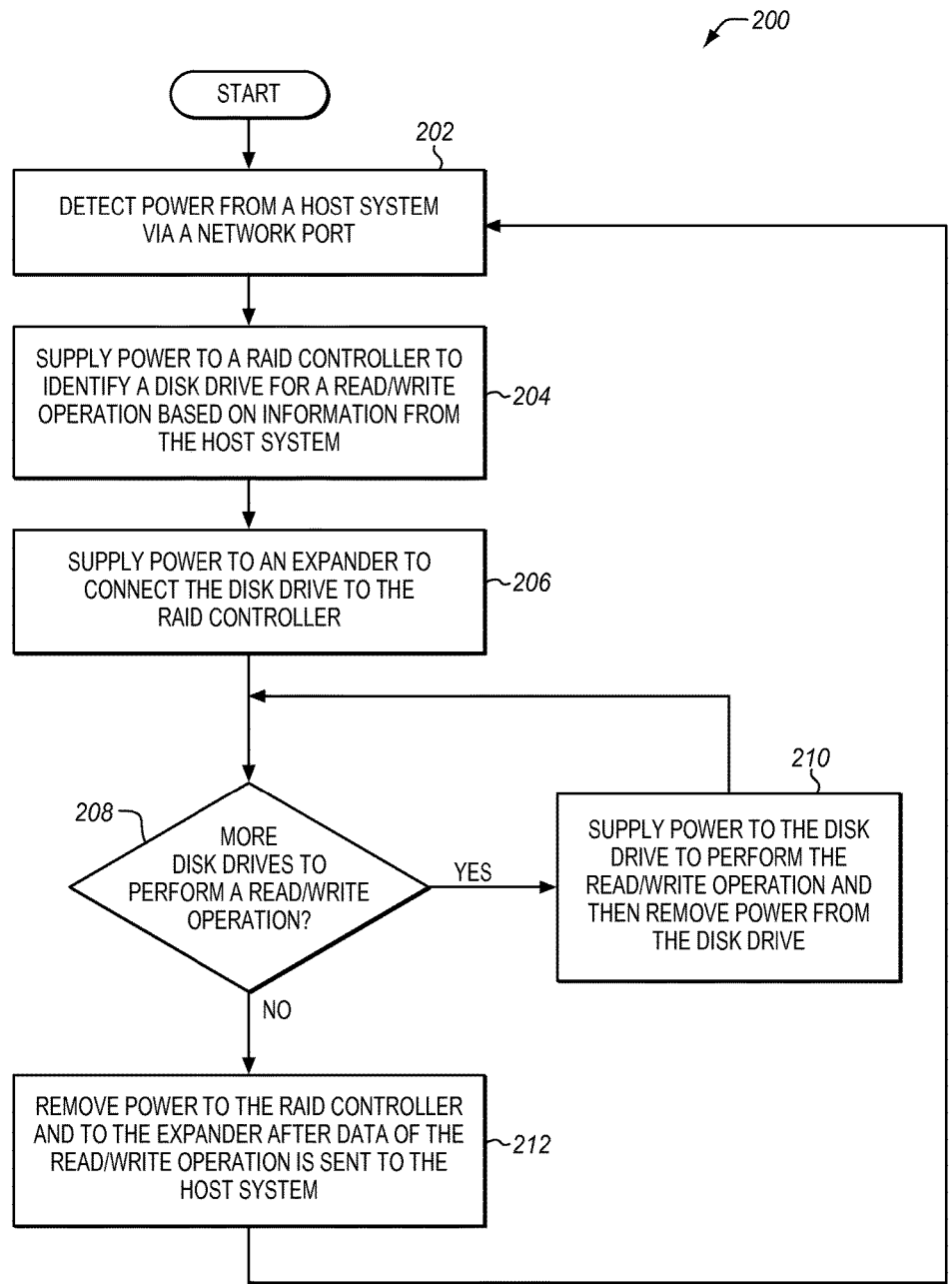
FIG. 2 is a flowchart describing an exemplary a method for powering a storage device over a data network.

FIG. 2 is a flowchart describing an exemplary method 200 for powering a storage device over a data network. Assume, for this embodiment, that at least one RAID volume has been established by the RAID controller 126, and that the RAID controller 126, the expander 130, and the storage devices 140-146 are initially powered down due to inactivity of read/write operations to the storage devices 140-146.

In step 202, the power module 122 detects power from the host 110 via port 124. The host 110 may be configured to transmit power over a data network (e.g., via POE or POS) to the power module 122 in response to determining that one or more of the storage devices 140-146 under the control of the RAID controller 126 are to be accessed for a read/write operation. In one embodiment, the power module 122 comprises an ultra low-power microcontroller configured with power control logic so that the host 110 spends minimal energy while the RAID controller 126, expander 130, and storage devices 140-146 are powered down.

In step 204, the power module 122, with power derived from the host 100 over the data network, supplies power to the RAID controller 126 with a power connection 172. After the RAID controller 126 is powered up, the RAID controller 126 communicates with the host 110 over the data network to identify the storage devices 140-146 for read/write operations. As discussed above, the RAID controller 126 communicates with the host 100 over the same data/network connection 170 that supplies power from the host 110.

In step 206, the power module 122, again with the power derived from the host 110 over the data network, supplies power to the expander 130 with a power connection 172.

When powered up, the expander 130 establishes a connection between the RAID controller 126 and the storage device 140-146 identified for a read/write operation. As discussed above, the expander 130 may be configured to route power supplied from the host 110 (e.g., POE, POS, etc.) to an individual storage device 140-146.

Upon determination to perform a read/write operation to a storage device 140-146 in step 208, that storage device 140-146 is then powered, in step 210, via power supplied over the data network from the host 110. After the RAID controller 126 performs the read/write operation on the storage device 140-146, the storage device 140-146 is powered down. Steps 208 and 210 may repeat as shown to individually/consecutively power multiple storage devices 140-146 under management of the RAID controller 126. For example, the RAID controller 126 may instruct the power module 122 to sequentially power up/down storage devices 140-146 to perform read/write operations for multiple storage devices 140-146 in accordance with RAID techniques (e.g., RAID level 0, 1, 5, 6, etc.) that provide data redundancy for a logical volume.

When there are no other storage devices 140-146 to have read/write operations, the power module 122 may power down components of the storage system 100 in step 212. For example, the RAID controller 126 determines that there are no more storage devices 140-146 to have read/write operations that are configured to connect through the expander 130. In response, the RAID controller 126 sends a command to the power module 122 to power down the expander 130. In another example, the RAID controller 126 determines that there are no more storage devices 140-146 to have read/write operations that are managed under the RAID controller 126. In response, the RAID controller 126 powers down. Before the expander 130 and/or the RAID controller 126 are powered down, the RAID controller 126 may report/transmit the result of one or more read/write operations back to the host 110.

The method 200 may repeat such that components (i.e., RAID controller 126, expander 130, storage devices 140-146) of the storage system 100 are powered down when there are no read/write operations to perform. Moreover, when the power module 122 detects upcoming read/write operation(s) for storage devices 140-146 under the management of the RAID controller 126, these components are selectively and temporarily powered back on to perform read/write operations to the storage devices 140-146 one at a time. Thus, the storage system 100 saves energy costs by using a data network to selectively apply power to its components at optimal times.

Figure 3:
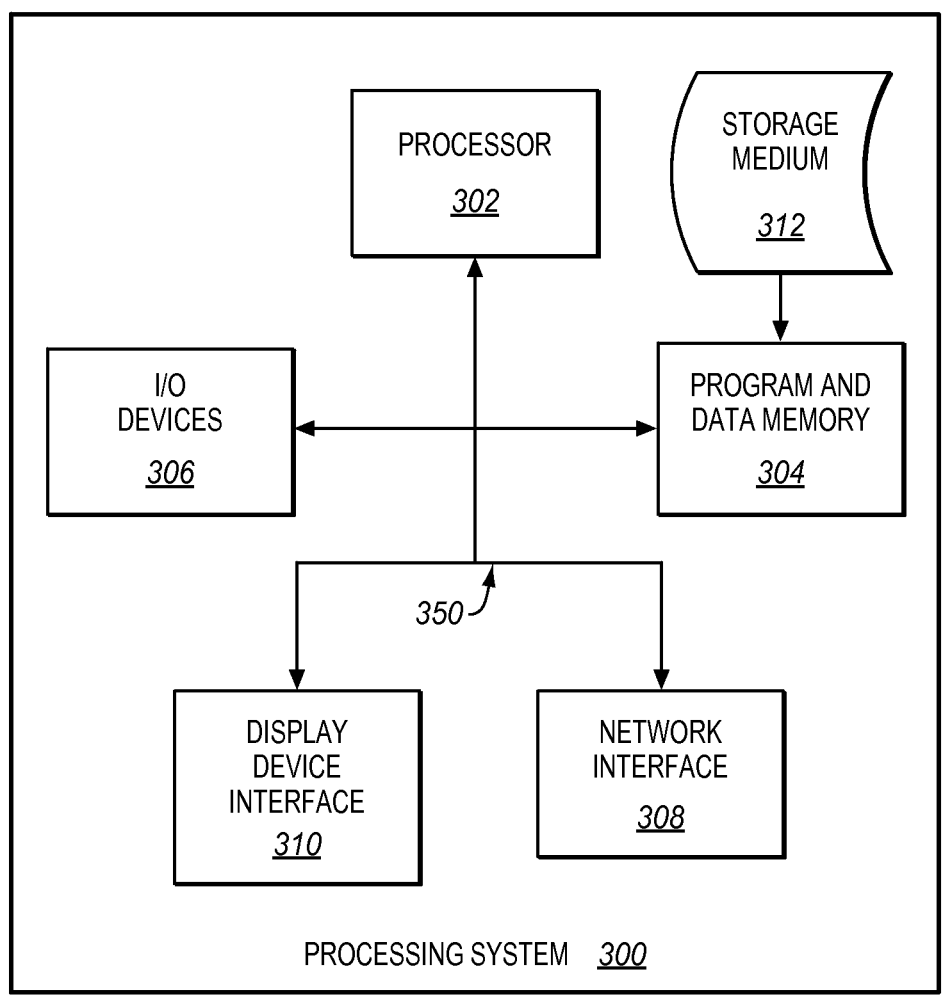
FIG. 3 illustrates an exemplary processing system operable to execute programmed instructions embodied on a computer readable medium.

Embodiments disclosed herein can take the form of software, hardware, firmware, or various combinations thereof. In one particular embodiment, software is used to direct a processing system of the storage system 100 to perform the various operations disclosed herein. FIG. 3 illustrates an exemplary processing system 300 operable to execute a computer readable medium embodying programmed instructions. Processing system 300 is operable to perform the above operations by executing programmed instructions tangibly embodied on computer readable storage medium 312. In this regard, embodiments of the invention can take the form of a computer program accessible via computer readable medium 312 providing program code for use by a computer (e.g., processing system 300) or any other instruction execution system. For the purposes of this description, computer readable storage medium 312 can be anything that can contain or store the program for use by the computer (e.g., processing system 300).

Computer readable storage medium 312 can be an electronic, magnetic, optical, electromagnetic, infrared, or semiconductor device. Examples of computer readable storage medium 312 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 300, being suitable for storing and/or executing the program code, includes at least one processor 302 coupled to program and data memory 304 through a system bus 350. Program and data memory 304 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 306 (including but not limited to keyboards, displays, pointing devices, etc.) can be coupled either directly or through intervening I/O controllers. Network adapter interfaces 308 can also be integrated with the system to enable processing system 300 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 310 can be integrated with the system to interface to one or more display devices, such as printing systems and screens for presentation of data generated by processor 302.

What is claimed is:

1. A storage control system, comprising:
a power module configured to detect power from a host system via a network port; and
a RAID controller configured to receive power derived from the network port of the power module, and in response, to identify a disk drive from among a plurality of disk drives in a RAID volume for an upcoming read/write operation based on information from the host system;
with power derived from the network port, the power module further configured to supply power to an expander that connects the disk drive to the RAID controller via a switched fabric, and to temporarily supply power to the identified disk drive to perform the read/write operation with the RAID controller, wherein the identified disk drive is supplied power to perform the read/write operation whereas others of the plurality of disk drives are not supplied power while the identified disk drive performs the read/write operation.

2. The storage control system of claim 1, wherein:
the power module is further configured to remove power to the identified disk drive after completion of the read/write operation, and to remove power to the input/output RAID controller and to the expander after data of the read/write operation is sent to the host system and after the identified disk driver is powered down.

3. The storage control system of claim 1, wherein:
the power is derived from the network port using a Power Over Ethernet standard.

4. The storage control system of claim 3, wherein:
the network port comprises an RJ45 connector.

5. The storage control system of claim 1, wherein:
the power is derived from the network port over a Serial Attached Small Computer System Interface data network.

6. The storage control system of claim 5, wherein:
the network port comprises an SFF-8644 connector compatible with the Serial Attached Small Computer System Interface protocol.

7. The storage control system of claim 1, wherein:
the RAID controller is further configured to manage multiple disk drives of the RAID volume, and to apply read/write operations to each of the multiple disk drives on behalf of the host system while sequentially powering up and powering down the multiple disk drives.

8. The storage control system of claim 1, wherein:
the expander is configured to route power supplied from the host to the identified disk drive and not other disk drives in the RAID volume via the switched fabric.

9. The storage control system of claim 1, wherein:
the expander is configured to exchange control and status information with the plurality of disk drives in the RAID volume to manage an amount of power allocated to the plurality of disk drives in the RAID volume.

10. A method, comprising:
detecting power from a host system via a network port of a power module;
with power derived via the network port of the power module:
  temporarily supplying power to a RAID controller configured to identify a disk drive from among a plurality of disk drives in a RAID volume for an upcoming read/write operation based on information from the host system;
  temporarily supplying power to an expander configured to connect the identified disk drive to the RAID controller via a switched fabric; and
  routing power to the identified disk drive through the expander and through the switched fabric to enable performance of the read/write operation, wherein the identified disk drive has power routed thereto to perform the read/write operation whereas others of the plurality of disk drives do not have power routed thereto while the identified disk drive performs the read/write operation.

11. The method of claim 10, further comprising:
removing power to the identified disk drive after completion of the read/write operation; and
removing power to the RAID controller and to the expander after data of the read/write operation is sent to the host system from the RAID controller and after the identified disk driver has power removed therefrom.

12. The method of claim 10, wherein:
the power is derived from the network port using a Power Over Ethernet standard.

13. The method of claim 10, wherein:
the power is derived from the network port over a Serial Attached Small Computer System Interface data network.

14. The method of claim 10, further comprising:
managing, with the RAID controller, multiple disk drives of the RAID volume; and
applying read/write operations to each of the multiple disk drives on behalf of the host system while sequentially powering up and powering down the multiple disk drives.

15. The storage control system of claim 1, wherein:
the RAID volume is managed by the RAID controller using either RAID level 0 or RAID level 1 techniques.

16. The storage control system of claim 1, wherein:
the RAID volume is managed by the RAID controller using either RAID level 5 or RAID level 6 techniques.

17. The method of claim 10, wherein:
the RAID volume is managed by the RAID controller using either RAID level 0 or RAID level 1 techniques.

18. The method of claim 10, wherein:
the RAID volume is managed by the RAID controller using either RAID level 5 or RAID level 6 techniques.

19. The method of claim 10, wherein:
the expander is configured to route power supplied from the host to the identified disk drive and not other disk drives in the RAID volume via the switched fabric.

20. The method of claim 10, further comprising:
determining that there are no more disk drives in the RAID volume to have a read/write operation performed thereon; and
sending a command from the RAID controller to the power module to power down the expander.

* * * * *